3,163,688
SLIP CASTING METHOD
John W. Lindenthal, Red Bank, N.J., assignor to Engelhard Industries, Inc., Newark, N.J., a corporation of Delaware
No Drawing. Filed Apr. 4, 1962, Ser. No. 184,942
7 Claims. (Cl. 264—56)

This invention relates to slip casting and more especially to a method for casting a silica slip in the manufacture of shaped ceramic articles.

One difficulty encountered heretofore in the slip casting of silica slips to form shaped ceramic articles has been the formation of a skin at the airslip interface. This undesirable skin formation was most prevalent in slips which had been ground sufficiently fine to otherwise develop optimum casting properties. Upon draining of the water in the mold, these skins would collapse and adhere irregularly to the ware causing rough surfaces. In an effort to overcome the skin formation, the grinding time was reduced so that the particles in the slip were larger. While this solved the skin problem, it resulted in too rapid casting rates, poor mold release and cast articles having low strength.

Various additives have been incorporated in the slips prior to casting, usually with harmful effects on the casting behavior. For instance ammonium carbonate and nitrate, sodium carbonate and nitrate, and potassium carbonate and nitrate were added to the slurry or slips prior to casting. However, such carbonates and nitrates were unsatisfactory because acting as flocculating agents. Waxes and gums were also unsatisfactory as additive for the reason their use resulted in increased skin formation.

In accordance with the present invention, a slip casting process is provided which is a considerable improvement over the previous slip casting methods for casting silica slurries, by reason of eliminating the troublesome and undesirable skin formation during the slip casting. The method involves grinding the silica to a finely divided particle size, adding ammonia to an aqueous slurry or mixture of the silica prior to the completion of the grinding, preferably before the grinding, and introducing the resulting aqueous slurry into a porous mold of the shape desired in the resulting product. The slurry is held in the mold for a time sufficient to form a wet cast therein of the thickness desired. The excess slurry is then removed from the mold followed by removal of the cast from the mold, drying of the cast and sintering or firing of the cast to strengthen same.

It is important the ammonia be added to the silica-water mixture or slurry prior to completion of the grinding, i.e. prior to commencement of the grinding or during the grinding. The reason for this is that skin formation tends to occur on a highly ground slip which is not in motion.

The ammonia is preferably added to the silica in $NH_3$ to $SiO_2$ weight ratio of from 1:2000 to 1:50,000, more preferably from 1:6000 to 1:20,000.

The ammonia is conveniently added as a solution in water, i.e. as ammonium hydroxide although it could be introduced as ammonia gas if desired. In addition to inhibiting skin formation at the slip-air interface the addition of the ammonia has the additional beneficial effect of imparting a desirable deflocculating action to the slurry.

In a preferred embodiment of the invention, the aqueous silica slurry is cooled to a temperature below room temperature but above the freezing point of the water of the slurry, subsequent to the addition of the ammonia and prior to the casting in the porous mold. This combination of the ammonia treatment and the cooling treatment gives an even more greatly improved resistance of the slurry to skin formation during the casting. Preferred temperatures of the cooling in this embodiment are within the range of about 5° C.–18°C.

The silica used to form the slip casting slurry of the present invention includes both vitreous silica and crystalline silica. The silica is preferably ground in the presence of water and for a period of from about 16–100 hours, more preferably from about 60–80 hours, to a particle size of preferably about 0.1–10 microns.

In the formation of the silica refractory article, after the slurry is poured into the dried porous mold, which is usually made of plaster of Paris, the mold soaks up and absorbs water from the slurry thereby building up on its inner surface a coating of the silica particles to form a layer of even thickness conforming to the mold surface. After sufficient time has passed after the pouring to give layer of the desired thickness on the mold surface, the excess slurry is removed from the mold by typically pouring. The resulting wet casting within the mold is then allowed to dry, after which it is removed from the mold which is usually easily accomplished due to the fact that the casting undergoes some shrinkage during the drying. The casting is then fired at temperatures typically of about 1000° C.–1200° C. to strengthen same.

The following examples further illustrate the invention:

Example I

Vitreous silica in the amount of 6 kg. was ground in the presence of 2.4 liters of water to a particle size of about 95 percent less than 5 microns. This aqueous silica slurry was then poured into a porous plaster of Paris mold at room temperature for formation of the cast. A skin formed on the surface of the slurry in the mold during the casting, and this skin stuck to the casting when the excess slurry was poured off resuliting in an unsatisfactory cast.

Example II

Vitreous silica of a particle size of —4 mesh in the amount of 6,000 grams was milled for 48 hours in the presence of 2400 ml. of water and 2.4 ml. of ammonium hydroxide of 28 percent $NH_3$ content. The resulting slurry was then poured into a porous plaster of Paris mold for casting. A good cast was obtained and there was no skin formation on the surface of the slurry or slip.

By reason of the addition of the 2.4 ml. of ammonium hydroxide, it was possible to increase the milling time during formation of the silica slurry to 72 and even as high as 96 hours with no tendency toward skin formation. These latter slips displayed improved casting yields due to an increase in drying shrinkage which promoted mold release, and also exhibited improvement in strength of the cast pieces.

Example III 6000 grams of vitreous silica of a particle size of —4 mesh is ground in the presence of 2.4 liters of water and 2.4 ml. of concentrated $NH_4OH$ for 72 hours in a ball mill. The resulting slip or slurry is cooled well below room temperature and down to 16° C. The thus-cooled slurry is then introduced at temperature of 16° C. into a porous plaster of Paris mold for formation of the cast. A good cast is formed without any skin formation.

It will be obvious to those skilled in the art that many modifications can be made in the scope of the present invention without departing from the spirit thereof and this invention includes all such modifications.

What is claimed is:
1. A method for casting a silica slip, which comprises grinding silica to a finely divided particle size, adding ammonia to an aqueous slurry of the silica prior to completion of the grinding, introducing the resultant slurry into a porous mold, forming a wet casting in the porous mold, followed by drying the casting, separating the casting from the mold, and firing the casting.

2. A method for casting a silica slip, which comprises grinding vitreous silica to a finely divided particle size, adding ammonia to an aqueous slurry of the vitreous silica prior to completion of the grinding, introducing the resulting aqueous slurry into a porous mold, forming a wet casting in the mold, followed by drying the casting, separating the casting from the mold, and firing the casting to impart strength thereto.

3. A method for casting a silica slip, which comprises grinding vitreous silica grains in the presence of water for a period of from about 60–80 hours to a particle size of about .1–10 microns, adding ammonia to the silica-water mixture before the grinding in amount within the weight ratio range of from 1:2000 to 1:50,000 of $NH_3$ to $SiO_2$ respectively, introducing the resultant slurry into a porous mold, forming a wet casting in the porous mold, followed by drying the casting and separating same from the mold, and firing the casting to impart strength thereto.

4. A method for casting a silica slip, which comprises grinding vitreous silica grains in the presence of water for a period of from about 60–80 hours to a particle size of about .1–10 microns, adding ammonia to the silica-water mixture before the grinding in amount within the weight ratio range of from 1:6000 to 1:20,000 of $NH_3$ to $SiO_2$ respectively, introducing the resultant slurry into a porous mold, forming a wet casting in the porous mold, followed by drying the casting and separating same from the mold, and firing the casting to strengthen same.

5. A method for casting a silica slip, which comprises grinding silica to a finely divided particle size, adding ammonia to an aqueous slurry of the silica prior to completion of the grinding, cooling the resultant slurry to a temperature below room temperature but above the freezing point of the water, followed by introducing the thus-cooled slurry into a porous mold, forming a wet casting in the mold, drying the casting and separating same from the mold, and firing the casting to impart strength thereto.

6. A method for casting a silica slip, which comprises forming an aqueous silica slip casting slurry, adding ammonia to the slurry, cooling the slurry to a temperature below room temperature but above the freezing point of water, introducing the thus-cooled slurry into a porous mold, forming a wet casting within the mold, followed by drying the casting, removing the casting from the mold, and firing the casting to impart strength thereto.

7. A method for forming and casting a silica slip, which comprises grinding vitreous silica grains and water for a period of about 60–80 hours to a particle size of about .1–10 microns, adding ammonia to the silica-water mixture prior to the completion of the grinding, cooling the resulting slurry to a temperature within the range of about 5° C.–18° C., introducing the thus-treated slurry into a porous mold, forming a wet casting within the mold followed by drying the casting, removing the casting from the mold, and firing the casting to strengthen same.

References Cited in the file of this patent
UNITED STATES PATENTS 2,290,686   Horsfield _____ July 21, 1942

OTHER REFERENCES

Advancements in Technical Ceramics, Jesse D. Walton, Ceramic Age, vol. 76, No. 2, Aug. 1, 1960, pages 33–37, 25–156S.

Notes on Casting Slip, Schramm et al., presented at the Annual Meeting, American Ceramic Society, Cincinnati, Ohio, February 1934 (White Wares Div.), pages 262–267 relied upon. 25–156S.

Ceramic Fabrication Processes, W. D. Kingery, Lib. of Congress Catalog Card Number: 58–6077, copyright 1958, Chapter 5, pages 45–51 relied upon.